United States Patent

[11] 3,602,645

[72] Inventor Cato Seeberg
   Hetlevik, Norway
[21] Appl. No. 761,409
[22] Filed Sept. 23, 1968
[45] Patented Aug. 31, 1971
[73] Assignee A/S Lehmkuhl
   Skoyen (Oslo), Norway
[32] Priority Nov. 9, 1967
[33] Norway
[31] 170468

[54] METHOD OF AUTOMATIC ENCIPHERING AND DECIPHERING OF SIGNAL PULSES
1 Claim, 3 Drawing Figs.

[52] U.S. Cl.................................................. 178/22
[51] Int. Cl.................................................. H04l 9/02
[50] Field of Search.......................................... 178/22

[56] References Cited
UNITED STATES PATENTS
3,036,156   5/1962   Gillespie...................... 178/22

Primary Examiner—Rodney D. Bennett, Jr.
Assistant Examiner—Daniel C. Kaufman
Attorney—Young & Thompson ABSTRACT: A method of enciphering signal pulses by means of a series of alternating positive and negative pulses which is inverted into an irregular code-controlled pattern and thereafter inverted in a second inverter which is controlled by the signal pulses and the resulting signal is used to key the transmitter, whereas at the receiver end the received signal is inverted controlled by the said code and thereafter decoded to obtain the deciphered signal.

INVENTOR.
CATO SEEBERG

METHOD OF AUTOMATIC ENCIPHERING AND DECIPHERING OF SIGNAL PULSES

This invention relates to a method for automatically enciphering and deciphering message signal pulses of equal or different length and spacing.

The enciphering and deciphering of such signal pulses are usually carried out for cryptographic teleprinter service in such a way that the en clair message pulses at the transmitting end are enciphered with a key material. At the receiving end, the enciphered signal pulses received are then processed with a corresponding key material in order to reproduce the en clair message pulses. The enciphering and deciphering are carried out by feeding the en clair message signal pulses and the enciphered message signal pulses respectively to a cryptoapparatus in the form of an electromechanical keying device which is controlled by the keying material in the form of a tape material perforated in an agreed pattern which at the transmitting end and the receiving end must run synchronously.

These systems presuppose signal pulses of a given shape and uniform length, for example teleprinter symbols consisting of five symbol units.

The object of this invention is to provide a method whereby automatic (online) enciphering and deciphering of message signal pulses can be carried out irrespective of the length of these signal pulses and the way they are grouped, i.e. without adhering to standardized message signal formats.

The system is thus particularly applicable to signal pulses, such as Morse telegraphy, in which the length and spacing of the pulses can vary considerably.

Figure 1:
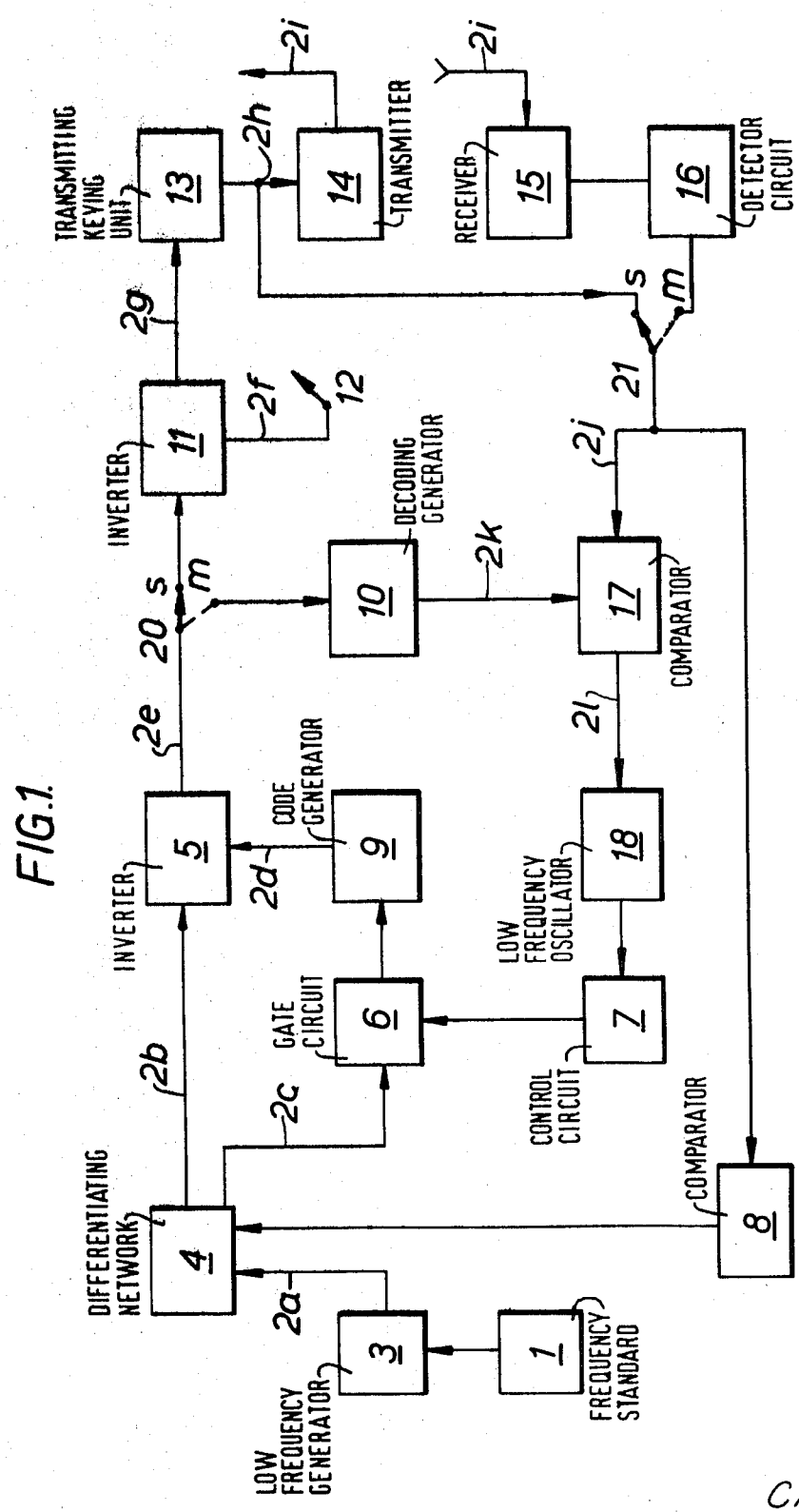
Figure 2:
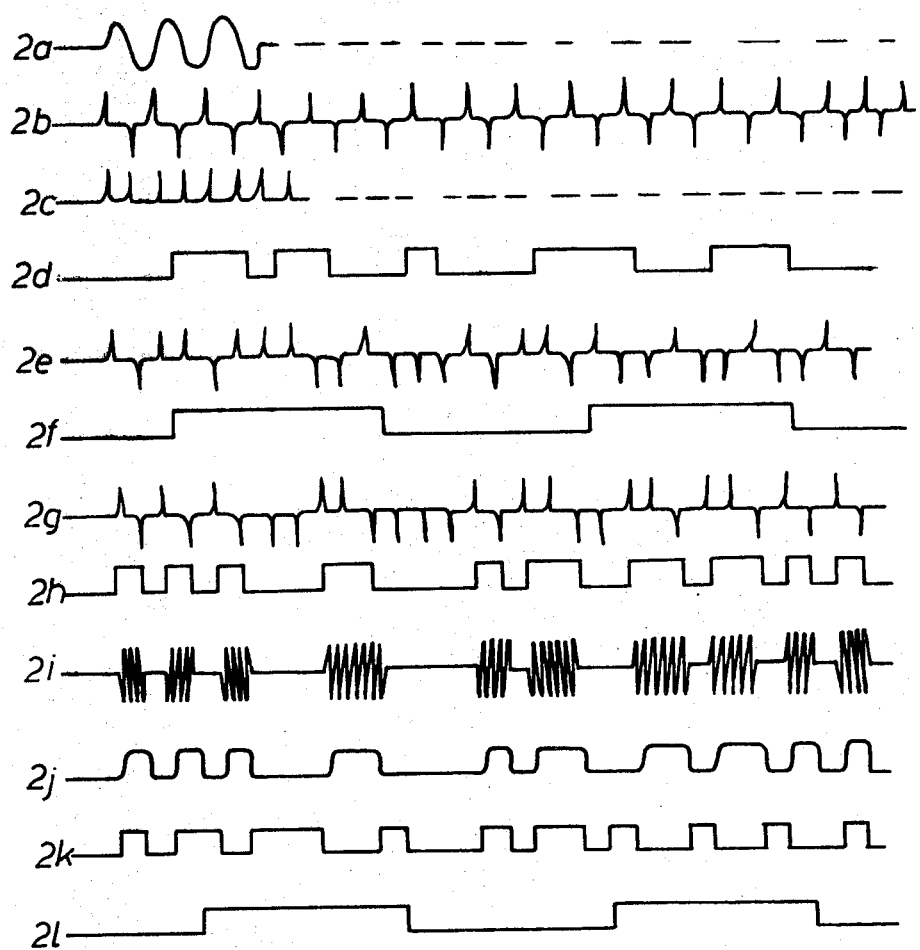
Figure 3:
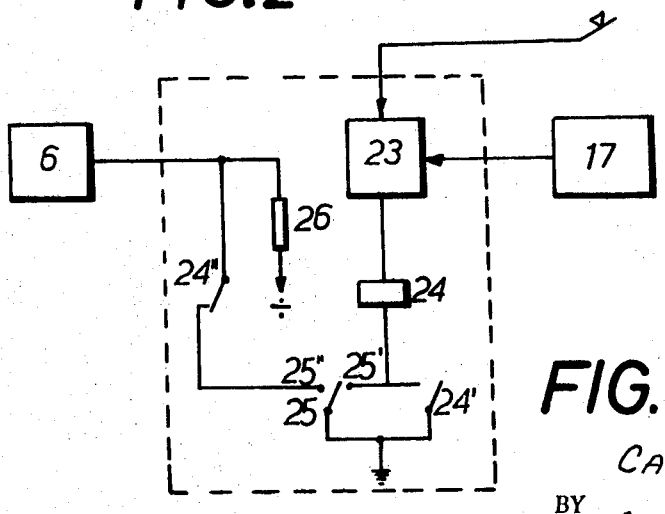

According to the present invention there is provided a method for enciphering and deciphering message signal pulses, in which some of the pulses of a separate series of regular, equidistant, alternating positive and negative pulses, (carrier pulses), each pulse width being a fraction of the smallest signal pulse width or space width between signal pulses, are arranged to be inverted in an irregular pattern by means of a cipher code-controlled inverter, whereupon the resulting modified series of positive and negative carrier pulses at the transmitter end is fed to a second inverter which is controlled by en clair message signal pulses in such a manner that the modified series of carrier pulses is further inverted as long as a message signal pulse is impressed on the second inverter, after which the resulting further modified series of carrier pulses is used to key the transmitter, as described below with reference to FIG. 2. At the receiving end a modified series of carrier pulses is produced by means of a cipher code, equal to and synchronous to that of the transmitter end, and these pulses are fed to a decoder in order to decipher the enciphered signals received. The invention will be described below by way of example with reference to the accompanying drawings, wherein:

FIG. 1 shows a block diagram of a combined transmitting and receiving circuit in accordance with the invention; and FIG. 2 shows various circuit pulse trains with the proper pulse shapes in order to explain the circuit of FIG. 1.

In carrying the invention into effect according to one convenient mode, by way of example, FIG. 1 shows a system in which a stable low-frequency generator 3, controlled by a frequency standard 1, supplies a sine wave 2a of e.g. 100 Hz., which is fed as driver to a pulse generating network 4 which delivers a pulse train 2b consisting of alternating positive and negative very narrow pulses, the carrier pulses, and also a series 2c of only positive, very narrow pulses. The latter pulse train, 2c, is used in a cipher code generator 9 to produce cipher code pulses 2d. The carrier pulse train 2b passes an inverter 5 which is controlled by the cipher code pulses in such a manner that the carrier pulses are inverted only as long as a cipher code pulse 2d is impressed on the inverter 5. The resulting, modified carrier pulse train 2e is fed, during transmission, to the signal inverter 11 through the changeover section 20. The signal inverter 11 is controlled by the en clair message signal pulse generator 12, in such a way that inversion only occurs as long as a message signal pulse 2f is impressed on the signal inverter 11. The resulting, now twice-modified carrier pulse train 2g controls a keying unit 13, in that a positive pulse closes the keying circuit which is not broken again until a negative pulse occurs, the keying circuit thus operated producing pulses 2h to control the transmitter 14, the output signal of which represents the enciphered signal (2i).

For receiving purposes, the changeover switch 20 is so set (position m) that the cipher code-inverted pulses are fed to the decoding circuit 10. A signal 2i which appears in the receiving aerial is, after having passed the receiver 15 and been filtered and rectified in the detector circuit 16, in such a way that the signal achieves the shape 2j. This signal is the received enciphered message signal. The once-modified carrier pulse train 2e, which is supplied by the cipher code inverter 5, is fed to the decoding circuit 10 which closes ro stays closed on positive pulses and opens or stays open on negative pulses, and thus produces a pulse train 2k which, together with the pulse train 2j is fed to a comparator 17 comprising a keying circuit which is broken when two signals have the same polarity and closed when the polarity is different. The pulse train 21 controls a low-frequency oscillator 18, the output signal of which represents the en clair message.

The coding apparatus is primarily intended for simplex communication, whereby the apparatus as described is changed over from transmission (position s) to reception (position m) by means of a changeover switch 20, 21. It is presupposed that the station with which one is communicating has corresponding coding apparatus. The frequency standard 1 in the two coding apparatuses will ensure that the frequency of sine wave 2a is very nearly the same at both stations. The synchronization and phasing occur automatically in that the pulse train 2j received from the detector circuit 16 is also fed to a comparator 8 which automatically synchronizes the pulse frequency and phase at the transmitting station. The changeover section 21 is in the position s during transmission and in the position m during reception, and forms, together with the changeover section, 20, a changeover unit for transmitting/receiving.

On establishing communication connection, the code generator 9 is blocked by the gate circuit 6. The signal transmitted is the en clair message mixed with a series of regular pulses, i.e. a series of rectangular, equidistant pulses, mark and space having the same width. The transmitted message pulses are thus scrambled, but not enciphered according to the invention. However, also scrambled message signals are converted in the comparator 17 into an en clair message again. In order to start the code generators, the transmitting station must transmit a particular start signal which, at the receiving station, is fed to the control circuit 7. This circuit is not affected by other signals, and will not start to function until it receives the particular start signal. When this happens, it opens the gate circuit 6 with the result that the code generator starts. At the transmitting station (during transmission), the enciphered keying signal will, by means of the changeover section 21, be fed to the comparator 17, and here deciphered again for the purpose of monitoring the en clair message signal after the processes of enciphering and deciphering. Similarly the starting signal will be fed to the control circuit 7 also at the transmitting station, with the result that the cipher code generators at the transmitting and receiving stations start simultaneously. The permissible time margin for synchronization of the cipher code generator is considerably larger than the propagation time from transmitter to receiver.

With regard to the cipher code generator, it must supply randomly pulses of varying lengths separated by spaces which also are of varying lengths. The cipher code pulse train must not be built up according to any particular system, that is to say, must not have the characteristics of regularity or periodicity. For the production of the cipher code pulses, the use can be envisaged of a counting register which has so many combination possibilities that the repetition of the same code group is avoided. The construction of such a cipher code generator does not form a part of the said invention.

Having described my invention, I claim:

1. A method of enciphering and deciphering signal pulses of equal or different lengths and spacing, comprising inverting in an irregular pattern by means of a cipher code-controlled inverter a series of equidistant, alternating positive and negative carrier pulses, the distance between subsequent pulses being a fraction of the shortest signal pulse or space between the signal pulses, the carrier pulses being inverted when, and only when, positive cipher code pulses are impressed on the inverter, then feeding the resulting modified series of carrier pulses at the transmitting end to a second inverter which is controlled by en clair message signal pulses in such a manner that the modified series of carrier pulses is further inverted as long as a message signal pulse is impressed on the second inverter, then keying a transmitter with the resulting further modified series of carrier pulses, positive carrier pulses causing the "on" state, negative carrier pulses causing the "off" state, and feeding to a decoder at the receiver end a series of modified carrier pulses produced by an inverter controlled by a cipher code equal to and synchronous to that at the transmitter end, thereby to decipher the enciphered signal received.